(12) United States Patent
McWhorter

(10) Patent No.: US 7,713,400 B2
(45) Date of Patent: May 11, 2010

(54) METHOD OF MAKING A NODULAR ELECTROLYTIC FLOCCULANT

(76) Inventor: Edward Milton McWhorter, 6931 Greenbrook Cir., Citrus Heights, CA (US) 95621

( * ) Notice: Subject to any disclaimer, the term of this patent is extended or adjusted under 35 U.S.C. 154(b) by 818 days.

(21) Appl. No.: 11/637,785

(22) Filed: Dec. 13, 2006

(65) Prior Publication Data

US 2008/0141827 A1    Jun. 19, 2008

(51) Int. Cl.
*C25C 3/02* (2006.01)
*C25C 3/36* (2006.01)

(52) U.S. Cl. .................. 205/354; 205/363; 205/402; 205/408

(58) Field of Classification Search .................. 205/363, 205/408, 402
See application file for complete search history.

(56) References Cited

U.S. PATENT DOCUMENTS 6,653,007 B2 * 11/2003 McWhorter .................. 429/19
6,669,836 B2 * 12/2003 Keppler et al. .............. 205/406
6,831,825 B1 * 12/2004 McWhorter ............... 361/321.6
2004/0182718 A1 * 9/2004 McWhorter ................. 205/354
2004/0265694 A1 * 12/2004 McWhorter .............. 429/231.9

* cited by examiner

*Primary Examiner*—Patrick Ryan
*Assistant Examiner*—William T Leader

(57) ABSTRACT

A method of rapidly cooling molten mixtures of alkali metal alloys in which the metal components of said alloys have a wide divergence of melting points that result in separation of the alkali metals during cool down. A calcium-sodium alloy is produced in an electrolysis cell. A method of high pressure atomization of the calcium-sodium alloy and its subsequent rapid cooling produces a calcium nodular particulate that is encased in a sodium flocculant. The material manufactured is used as a nodular electrolytic flocculant reactant in the electrolyte of an alkaline battery.

1 Claim, 1 Drawing Sheet

METHOD OF MAKING A NODULAR ELECTROLYTIC FLOCCULANT

CROSS REFERENCES

The present invention relates to my copending application and U.S. patents.

Ref. 1. U.S. Pat. No. 6,653,007 issued Nov. 25, 2003
Ref. 2. U.S. Pat. No. 6,831,825 issued Dec. 14, 2004
Ref. 3. Ser. No. 10/392,608 filed Mar. 21, 2003, now abandoned
Ref. 4. Ser. No. 10/607,245 filed Jun. 27, 2003 now abandoned

BACKGROUND OF THE INVENTION

It is the primary purpose of the invention to describe a novel process for the simultaneous electrolysis and alloying of mixtures of alkaline metals and alkaline earth metals respectively of Group I and Group II elements of the Periodic table to produce calcium nodular particles encased within sodium metal flocculant.

The reduction of sodium chloride (NaCl) and calcium chloride ($CaCl_2$) molten salts to their base metals is carried out in a high temperature electrolysis cell. In the molten state within the electrolysis cell sodium and calcium reduced metals are true alloys. Because of their wide divergence of their melting points sodium and calcium separate into their individual elements during cool down. In the invention a high pressure jet of inert gas is used to fragment a thin stream of the molten metal that is pumped at high pressure through a nozzle. The fragmented molten alloy forms solid calcium particles within a surrounding film of molten sodium. With continued cooling the said molten sodium freezes around the said calcium particle encasing the calcium particle forming nodular calcium particles within a sodium flocculant, herein-after referred to as nodular electrolytic flocculant.

Mixtures of alkali metals are hereinafter referred to in the specification as nodular electrolytic flocculant. Mixtures of alkali metal particulate were first described in Ref. 1 of the cross-references as dispersions in a heavy base mineral or silica base oil. A method of alloying sodium and calcium in an electrolysis cell and blasting a high pressure molten stream of this material with an inert gas was subsequently described in Ref. 3 of the cross-references.

The selected alkali metals of Ref. 1 and Ref. 3 are comprised of Group I alkaline metals, Lithium, Sodium, and Potassium, and of Group II alkaline earth metals, Calcium and magnesium as they respectively appear in the Periodic Table. In common practice molten mixtures of sodium and calcium are separated after reduction by means of their wide divergence of freezing temperatures and specific gravities. It is an object of the invention to produce these two metals simultaneously without separation as a nodular flocculant compound of sodium and calcium.

In accordance with the First Law of Thermodynamics the energy stored in an alkali metal during electrolysis reduction is returned in equivalent proportion during hydrolysis of the metal and subsequent oxidation in reverse chemical reaction as basic hydroxides of the said metal in the electrolyte. The electro-equivalent stored energy released in the electrolyte during hydrolysis of said metal is given in terms of Amp-hours per pound of each element is shown in Table I.

TABLE I

ELECTROLYTIC FUEL ELEMENTS
ELECTROCHEMICAL EQUIVALENT

| Active Metals | Equivalent Weight | Stored Energy Amp-hr/lb |
|---|---|---|
| Lithium | 6.940 | 1,751.99 |
| Sodium | 22.997 | 528.71 |
| Potassium | 39.096 | 311.00 |
| Calcium | 20.040 | 606.74 |
| Magnesium | 12.160 | 999.90 |

The electrochemical equivalents of Table 1 do not include the heat energy input into the electrolysis cell necessary to raise the metal salts to their molten state temperature driving off the chlorine and leaving the metal components. By the First law of thermodynamics, the heat of formation of calcium and sodium compounds is returned during the highly exothermic reaction of the fused metals in the electrolyte and these are somewhat similar to Carnot losses and do not effect the electrochemical values shown in Tale 1.

The invention provides the method of combining alkali metals shown in Table I in the production of nodular electrolytic flocculant alloys to produce electrical current during hydrolysis in an electrolyte of a battery. The electrical storage capacity of the alkali metals and electrical current produced in the said battery will be more efficient in vehicle electrical propulsion systems than those presently operating in rechargeable storage batteries and will be more competitive with internal combustion engines using fossil or other carbonaceous fuels.

The elements shown in Table I represent approximately 10.4% of the mass of the earth's crust as compared to 0.08% for all carbon baring materials comprised principally of fossil fuels, coal, and petroleum. The comparative abundance of alkaline and carbonaceous materials in the earth's crust available as possible material sources for the production of each type of fuel energy is shown in Table 2.

TABLE 2

MASS PERCENT OF ELEMENTS IN THE EARTH'S CRUST

| Electrolytic Fuel Element | Mass % |
|---|---|
| Lithium | — |
| Sodium | 2.68 |
| Potassium | 2.40 |
| Calcium | 3.39 |
| Magnesium | 1.93 |
| Carbon | 0.08 |

The cost of the nodular electrolytic flocculants are extremely low and are in sufficiently available quantities to be competitive with coal and crude oil prices. Beside being more abundant and cheaper to produce than fossil fuels the elements of said electrolytic alloyed material is geographically more evenly distributed. It is therefore another object of the invention to economically produce nodular electrolytic flocculant material in sufficient quantities to supply global transportation needs.

The two alkali metals of greatest utility in the manufacture of nodular electrolytic flocculant are Sodium and calcium. Calcium and Sodium were chosen because of their abundance as shown in Table 2 and because they are globally distributed in sea water and in limestone formations. In common practice Sodium and calcium are often times produced simultaneously by electrolysis of mixtures of their molten chloride salts, comprising sodium chloride (NaCl) calcium chloride (CaCl$_2$). After reduction, the two alkali metals are separated since no commercial use has been ascertained for the cost of a difficult development program required to support the manufacture of their fused alloyed mixture. In the present invention the calcium and sodium component metals are not separately produced and are used as an individual basic material in the manufacture of a variety of nodular electrolytic alkali metal flocculants.

A major concern in the production of sodium-calcium alloy is to maintain an even distribution of each metal during their solidification. Because of the wide divergence of the melting point of the two metals as shown below in Table 3, calcium begins to solidify at about 400° F. above the melting point of sodium. At this temperature the calcium solidifies and settles out in large chunks in the remaining molten sodium and the mixture separates into its two component metals. In order to prevent this the alloyed mixture must be rapidly cooled below the melting point of sodium 97.5° C. (207.5° F.) which is well below the freezing point of calcium which is 810° C. (1490° F.) as shown in Table 3.

TABLE 3

PROPERTIES OF CALCIUM AND SODIUM

| Thermal Properties | Calcium | Sodium |
| --- | --- | --- |
| Melting point ° C. | 842 | 97.8 |
| Specific heat J/gK | .647 | 1.228 |
| Enthalpy of fusion J/g | 213.1 | 113.1 |
| Molten density gm/cm$^3$ | 1.378 | .927 |

In the present invention separation of the molten alloy of sodium-calcium mixture still occurs during cool down and the calcium settles out as a particulate within the sodium that remains in the liquid state. It is the objective of the invention to provide a rapid method of cooling the said calcium particle quickly such that the liquid sodium component freezes on the surface of the said calcium particle forming a nodular flocculant.

SUMMARY OF THE INVENTION

The invention is a process for joining alkali metals having a wide divergence of melting points. Specifically the main concern is the maintaining of the relative even distribution of each metal during the cooling process of the molten alloy of sodium and calcium.

It is a primary objective of the invention to produce a nodular electrolytic flocculant compound in which the metal components of the said compound are evenly distributed.

It is another objective of the invention to rapidly cool a molten alkali metal compound below the freezing point of each component of the compound such that their even distribution as a nodular flocculant mixture is assured.

It is another object of the invention to transfer the heat from a molten alkali metal alloy into an inert gas during the atomization and flocculation of the said alloy.

It is yet another object of the invention to transfer the heat of the said inert gas used in the said atomization and flocculation process of a molten alkali metal alloy into a water cooled heat exchanger.

BRIEF DESCRIPTION OF THE DRAWINGS

A diagrammatic flow pattern of the alloying process is presented as FIG. 1. The portion of the said flow pattern pertinent to this invention is the inert gas cooling circuit, said inert gas cooling circuit designated by a broken line border which separates the proprietary elements of Ref. 3 of the cross references from the present invention.

DETAILED DESCRIPTION OF THE INVENTION

Figure 1:
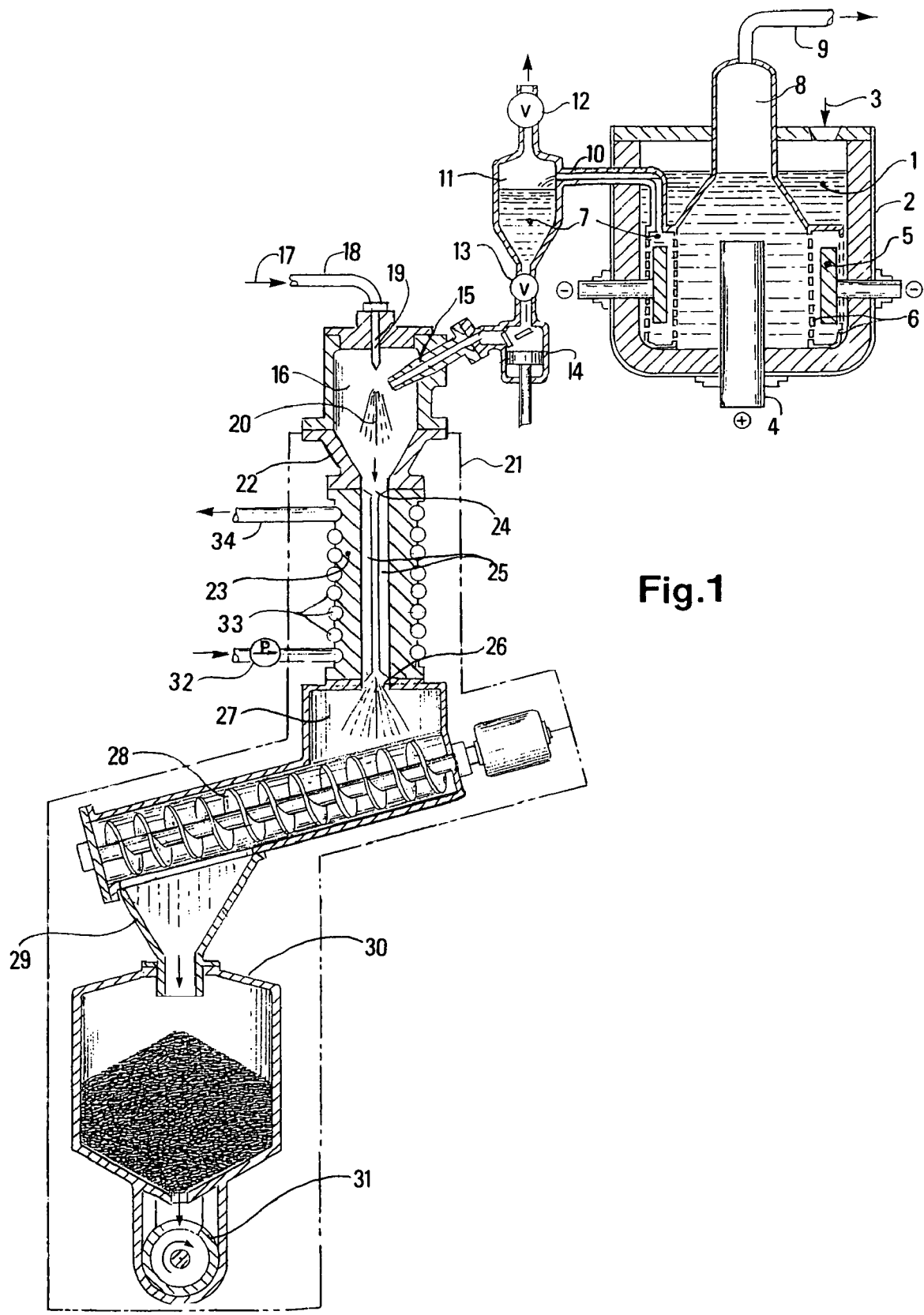
FIG. 1 Is a diagrammatic drawing of the electrolysis cell that produces the molten alkali metal alloyed mixture and the high pressure flocculation equipment that produces the heated flocculant material that passes into the proprietary cooling circuit of the present invention.

FIG. 1 is a diagrammatic illustration of the process of alloying molten mixtures of alkali metals having a wide divergence of solidification temperatures. In the example presented in FIG. 1 sodium chloride (NaCl) and calcium chloride salt mixtures 1 are reduced to their base metals in a high temperature electrolysis cell 2, hereinafter called the cell 2. The cell 2 is comprised of an opening 3 for charging the said sodium and calcium salts, a graphite anode 4, an iron ring cathode 5 and a circular ion screen 6 on each side of said cathode 5. The said ion screen 6 prevents chlorine ions from recombining with the reduced molten metals mixture 7 that gathers adjacent to cathode 5 and conducts the chlorine upward into hood 8 and into chlorine discharge conduit 9. The said reduced molten metals 7 are decanted from the cell 2 through conduit 10 and enters into heated receiver 11. The said receiver comprises a gas pressure valve 12 at the upper end and a molten metal control valve 13 that controls the flow of the said molten metal 7 flow into high pressure pump 14 that pushes the metal at high pressure through nozzle 15 into atomization chamber 16 where it is atomized by an impinging high pressure inert gas 17 supplied from conduit 18 stream passing through nozzle 19 into said atomization chamber 16. The said impinging inert gas 17 from nozzle 19 enters atomization chamber 16 at a low temperature and expands rapidly at the higher temperature in contact with the molten metal stream from nozzle 15 subsequently pressurizing chamber 16 and absorbs heat cooling the calcium component of the molten metal 7 mixture below its freezing point forming a solid calcium metal particle surrounded by a liquid sodium shell to form a flocculant 20 mixture of liquid sodium-solid calcium material formed in chamber 16. In Ref. 3 the said flocculant 20 material is emptied directly into a tumbler and processed by mixing with other materials which promote cooling and prevent the flocculant 20 from setting up as a solid composite resulting from the interstitial hardening of the sodium metal as it cools down below its freezing point. In the present invention the flocculant 20 material undergoes an additional cooling process. The said additional cooling process which constitutes the claimed novelty of this invention over that presented in Ref. 3 is shown in FIG. 1 within the broken border line 21.

The high pressure heated inert gas 17 in chamber 16 passes through convergent section 22 attached to heat exchanger 23. The said high pressure heated gas carries flocculant 20 into inlet 24 of heat exchanger 23 at sonic speed to prevent fouling of the interior surface of the heat exchanger. The heated inert gas 17 is cooled by its passage through heat exchanger 23 cooling fins 25 and carries flocculant 20 through heat exchanger 23. Heat transferred to heat exchanger 23 is carried away by cooling water from pump 32 which circulates the water through cooling coil 33 and exits the heat exchanger cooling circuit and is carried away by conduit 34. At the exit 26 of heat exchanger 23 the heated inert gas 17 expands and discharges the flocculant 20 into cooling chamber 27 and into conveyer 28 where it is carried to chute 29 and emptied into receiver 30 and passes through rotary valve 31 and passes out of the system beyond borderline 21 for further processing.

LIST OF ELEMENTS 1. salt mixture
2. electrolysis cell
3. opening
4. anode
5. cathode
6. screen
7. molten metal mixture
8. hood
9. conduit (chlorine)
10. conduit (molten metals)
11. receiver
12. valve (gas)
13. valve (control)
14. pump
15. nozzle
16. atomization chamber
17. inert gas
18. conduit (inert gas)
19. nozzle
20. flocculant
21. border line
22. convergent section
23. heat exchanger
24. inlet
25. cooling fans
26. exit
27. cooling chamber
28. conveyer
29. chute
30. receiver
31. valve
32. pump
33. cooling coil
34. conduit (cooling water)

What is claimed is:

1. A method for producing a nodular electrolytic flocculant comprising:

charging an electrolysis cell with a mixture of calcium chloride and sodium chloride salts and heating the electrolysis cell to form a molten salt mixture, electrolytically reducing said molten salt mixture to form a calcium-sodium alloy molten liquid along with chlorine gas, discharging said chlorine gas from said electrolysis cell, pumping said calcium-sodium alloy molten liquid as a high pressure liquid stream into an atomization chamber through a nozzle, in the atomization chamber impinging an inert gas from an inert gas nozzle onto said high pressure calcium-sodium alloy molten liquid stream, said impingement of inert gas on said high pressure liquid stream transferring heat from said calcium-sodium alloy molten liquid causing said calcium component to cool below its freezing point thereby forming solid calcium metal particles surrounded by a liquid sodium shell, carrying said particles by said inert gas into a heat exchanger, said sodium liquid cooling below its freezing point in said heat exchanger to encase the calcium particles and to form nodular electrolytic flocculant comprising nodular calcium particles within a sodium flocculant, carrying said nodular electrolytic flocculant from said heat exchanger into a cooling chamber by said inert gas for further cooling, and passing said nodular electrolytic flocculant from said cooling chamber into a conveyer which carries it to a receiver.

* * * * *